(No Model.)
M. L. WARSON & E. F. PICKETT.
PNEUMATIC TIRE.
No. 548,900.  Patented Oct. 29, 1895.
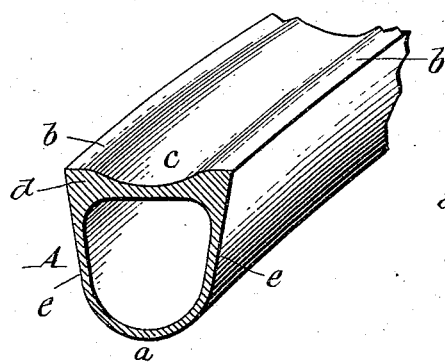
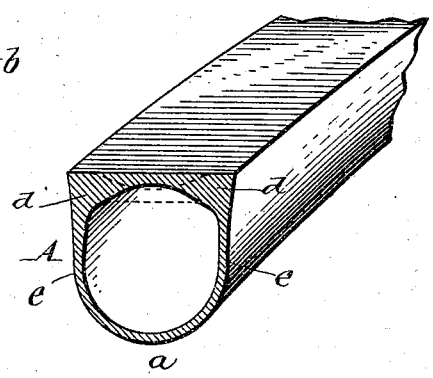
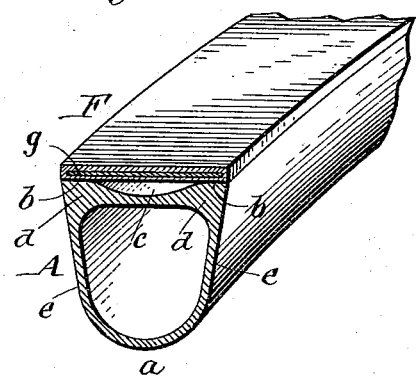
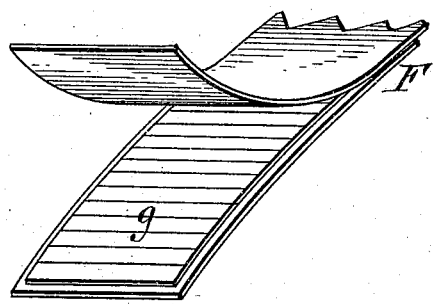
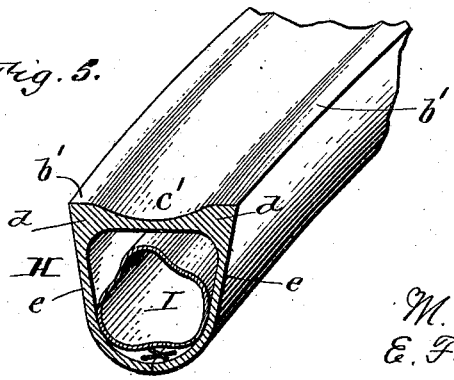
Witnesses:
Theo. L. Popp.
Henry L. Deck.
M. L. Warson
E. F. Pickett
Inventors
By Wilhelm Bonner
Attorneys.

United States Patent Office.

MARTIN L. WARSON AND EDWARD F. PICKETT, OF BUFFALO, NEW YORK.

PNEUMATIC TIRE.

SPECIFICATION forming part of Letters Patent No. 548,900, dated October 29, 1895.

Application filed July 9, 1895. Serial No. 555,378. (No model.)

*To all whom it may concern:*

Be it known that we, MARTIN L. WARSON and EDWARD F. PICKETT, citizens of the United States, residing at Buffalo, in the county of Erie and State of New York, have invented a new and useful Improvement in Pneumatic Tires, of which the following is a specification.

This invention relates more particularly to pneumatic tires, which consist, essentially, of an inflatable tube having a flat tread or bearing-face. In such tires as hitherto constructed the tread, while flat in the free or deflated condition of the tire, expands to an oval or convex form upon being inflated, and the advantages sought to be gained by the use of a flat tread are therefore not realized. This tendency of the tread to assume an oval form is especially objectionable when a protecting shoe or armor is applied to the same to prevent puncturing of the tire by sharp objects, in which case the bulging of the tread raises and detaches the edges of the shoe or armor from the tread, allowing grit, &c., to enter between the latter and the shoe and causing the ultimate separation of the shoe from the tire.

One of the objects of our invention is to so construct the tire that the tread maintains its flat form when the tire is inflated, thus obtaining the advantages of such a tire and enabling an armor or shoe to be reliably retained thereon.

Our invention has the further objects to provide the tire with a shoe or armor which effectually protects the tire against puncture without impairing its resilence, and to construct the tire in such a manner that when inflated its side walls remain practically within the longitudinal edges of the tread or armor, whereby tacks or other sharp objects are prevented from reaching those walls.

In the accompanying drawings, Figure 1 is a sectional perspective view of a portion of a pneumatic tire containing our improvement, showing the tire in its deflated condition. Fig. 2 is a similar view showing the tire in its inflated condition. Fig. 3 is a view similar to Fig. 1 showing the protecting-shoe applied to the tire. Fig. 4 is a detached perspective view of a portion of the shoe. Fig. 5 is a sectional perspective view showing our improvements in connection with a double-tube tire.

Like letters of reference refer to like parts in the several figures.

Referring to Figs. 1 to 4, A is the hollow tire, which consists of a tube having a flat tread and a convex or rounded seating side $a$, which lies in the groove of the rim. The tread is provided between its flat marginal portions $b$ with a longitudinal groove or depression $c$, extending continuously around the tire, and the corners $d$, formed by the junction of the tread and the side walls $e$ of the tire, are thickened, as shown in the drawings, so as to render said corner portions practically non-expansible. The depressed or grooved portion of the tread is considerably thinner than the corners, so as to yield when the tire is inflated. By this construction upon inflating the tire only the depressed central portion of the tread is expanded, and its outer surface is brought in line or flush with the flat marginal portions of the tread, as shown in Fig. 2, thereby rendering the tread substantially flat and smooth from edge to edge. As the thickened corners of the tread are practically unaffected by the inflation of the tire, they check the expansion of the depressed central portion of the tread and prevent the same from bulging into an oval or convex form. The tread is recessed or depressed to such a depth and the corners are thickened to such an extent that the expansion of the depressed central portion is arrested when in line with the marginal portions of the tread. In order to produce a perfectly-flat tread-face on inflation, the concave bottom of the longitudinal depression is joined with the flat marginal portions by gentle or gradual ogee curves, as shown.

Our improved tire can be molded of rubber in one piece like an ordinary cylindrical tire and at substantially the same cost.

When a tire thus constructed is used in connection with a metallic or other armor for protecting it against puncture, the armor is not bulged or crowned in the middle and eventually separated from the tire, but remains flat, like the tread of the tire, thereby avoiding loosening of its edges and enabling it to remain securely upon the tire.

Any suitable flat annular armor or protecting-shoe may be applied to the tire, but we prefer that which is shown in Figs. 3 and 4 of the drawings. This shoe consists of an endless band *f*, of rubber, and transverse plane or flat strips of very thin steel or other suitable hard and resilient material embedded in the rubber band. In the drawings, the strips are exaggerated for the sake of clearness. These strips are arranged flush with each other and closely together, but are slightly separated by very thin films of rubber, which enter between adjoining strips. The annular series of transverse strips extends throughout the endless band and forms therewith an annular flexible armor, which effectually prevents tacks and other sharp objects from reaching the tread and puncturing the same. Adjacent strips are free to yield individually, as they do not rest one upon the other, or are otherwise connected, except by the rubber in which they are embedded, and the tire is therefore practically as resilient as one having no such armor. Any one or more of the strips can thus yield in passing over an obstruction without affecting adjacent strips, thus indenting the tire to a correspondingly small extent and reducing the jar or vibration received by the machine to a minimum.

The shoe is of the same width as the tread, and the protecting-strips preferably terminate at a short distance from the edges of the shoe, so that they are completely inclosed therein and prevented from rusting. The shoe may be formed by laying the protecting-plates between two endless strips of rubber and then vulcanizing the strips together, forming a single endless band, in which the plates are embedded. The endless flat shoe is cemented to the tread in the deflated condition of the tire, as shown in Fig. 3, in which condition of the parts the shoe bridges the annular recess or groove in the peripheral face of the tire. Upon inflating the tire the thin depressed face portion of the tire forming the bottom of the recess rises until it becomes flush with the thickened edge portions and bears snugly against the inner side of the shoe. As the inflation of the tire does not drive this central portion of the peripheral face outward beyond the position in which it forms with the marginal portions a flat face— in other words, does not crown or bulge the peripheral face of the tire—there is no tendency developed to lift or force the shoe from the faces of the marginal portions of the tire. The shoe therefore remains securely connected with the tire, whether the latter be inflated or deflated, although the shoe expands slightly with the tire upon inflating the latter.

The shoe is complete in itself and can be removed from the tire when worn out and replaced by a new one.

In order to prevent the side walls of the tire from bulging beyond the edges of the tread or armor and thereby avoid puncturing of the same, they are arranged to converge toward the seating side of the tire, as shown. Owing to this arrangement of the side walls and the thickening of the tread corners when the tire is inflated, the non-expansible corners restrain the expansion of the side walls beyond the longitudinal edges of the tread and allow only those portions thereof to expand which are comparatively remote from the tread, as shown in Fig. 2, thus preventing the same from being reached by objects liable to puncture the tire.

Our improvements are applicable to double-tube tires, comprising an inner air-tube and an inclosing cover or sheath, as well as to single-tube tires, such a construction being shown in Fig. 5. In this case the tread of the sheath H is provided with the flat marginal portions $b'$ and the central depressed portion $c'$, and its side walls converge toward the seating side of the tire, while the air-tube I may be made cylindrical in the usual manner.

We claim as our invention—

1. A pneumatic tire having its tread composed of thickened marginal portions having flat faces and an intermediate thin face-portion which is depressed below the faces of the marginal portions, forming an annular depression or groove in the face of the tire when deflated, which thin central portion is raised to the level of the marginal faces upon inflating the tire, forming therewith a practically flat face, substantially as set forth.

2. The combination with a pneumatic tire having its tread composed of thickened marginal portions having flat faces and an intermediate thin face-portion which is depressed below the faces of the marginal portions, forming an annular depression or groove in the face of the tire when deflated, of a flat shoe or armor secured to said marginal face portions and extending over the intermediate depressed face-portion of the tire, substantially as set forth.

Witness our hands this 6th day of July, 1895.

MARTIN L. WARSON.
    EDWARD F. PICKETT.

Witnesses:
 W. R. GREGORY,
 CARL F. GEYER.